US008566490B2

(12) United States Patent
Weidenkeller

(10) Patent No.: US 8,566,490 B2
(45) Date of Patent: Oct. 22, 2013

(54) METHOD AND SYSTEM FOR ADDRESS ALLOCATION FOR A PLURALITY OF DEVICES CONNECTED TO A MULTI-MASTER BUS

(75) Inventor: Andreas Weidenkeller, Berlin (DE)

(73) Assignee: Fluke Corporation, Everett, WA (US)

( * ) Notice: Subject to any disclaimer, the term of this patent is extended or adjusted under 35 U.S.C. 154(b) by 151 days.

(21) Appl. No.: 13/118,571

(22) Filed: May 30, 2011

(65) Prior Publication Data
US 2011/0296067 A1 Dec. 1, 2011

(30) Foreign Application Priority Data
May 31, 2010 (EP) .................................. 10005641

(51) Int. Cl.
G06F 13/00 (2006.01)
G06F 13/364 (2006.01)

(52) U.S. Cl.
CPC .................................. G06F 13/364 (2013.01)
USPC .......................................... 710/110; 710/317

(58) Field of Classification Search
USPC ........... 710/104–119, 8–19, 300–315, 62–64
See application file for complete search history.

(56) References Cited

U.S. PATENT DOCUMENTS

| 4,680,583 | A | 7/1987 | Grover | |
|---|---|---|---|---|
| 5,787,306 | A | 7/1998 | Michael | |
| 6,813,525 | B2 * | 11/2004 | Reid et al. ........................ | 700/19 |
| 6,865,596 | B1 * | 3/2005 | Barber et al. ................. | 709/208 |
| 6,907,226 | B2 * | 6/2005 | Kang et al. .................... | 455/41.2 |
| 6,967,565 | B2 * | 11/2005 | Lingemann ................ | 340/12.23 |
| 6,980,080 | B2 * | 12/2005 | Christensen et al. .......... | 340/3.5 |
| 7,281,070 | B2 * | 10/2007 | Bomhoff et al. .............. | 710/110 |
| 2004/0019720 | A1 * | 1/2004 | Trembley ...................... | 710/110 |
| 2004/0208200 | A1 * | 10/2004 | Hejdeman et al. ............ | 370/476 |
| 2005/0223147 | A1 * | 10/2005 | Hellwig et al. ............... | 710/110 |
| 2008/0034132 | A1 * | 2/2008 | Nakatake ........................ | 710/35 |
| 2008/0162758 | A1 * | 7/2008 | Gideons ......................... | 710/110 |
| 2009/0177823 | A1 * | 7/2009 | Chao ........................... | 710/110 |
| 2009/0193166 | A1 * | 7/2009 | Kropp et al. .................. | 710/110 |
| 2009/0234998 | A1 * | 9/2009 | Kuo .............................. | 710/110 |
| 2011/0082956 | A1 * | 4/2011 | Kazama ........................ | 710/110 |
| 2011/0106996 | A1 * | 5/2011 | Rosso .......................... | 710/300 |
| 2011/0119419 | A1 * | 5/2011 | Chapelle ....................... | 710/110 |
| 2012/0191890 | A1 * | 7/2012 | Liao et al. ..................... | 710/110 |

FOREIGN PATENT DOCUMENTS

| EP | 0893767 A2 | 1/1999 |
|---|---|---|
| EP | 1209878 A2 | 5/2002 |

OTHER PUBLICATIONS

European Search Report, pp. 1-2.

* cited by examiner

Primary Examiner — Raymond Phan
(74) Attorney, Agent, or Firm — Beem Patent Law Firm

(57) ABSTRACT

An automatic addressing bus system and method of communication comprising a main and an end device, wherein the respective bus controllers used in the main and end devices comprise multi-master capability. The main controlling device has an address known to the end device to be connected, the end device is able to actively initiate the address allocation procedure, without the need for user interaction. The method and system of the present system may be implemented using such known bus systems such as 2-wire serial buses, in particular I²C, and enables both automatic and dynamic address allocation.

12 Claims, 2 Drawing Sheets

METHOD AND SYSTEM FOR ADDRESS ALLOCATION FOR A PLURALITY OF DEVICES CONNECTED TO A MULTI-MASTER BUS

CROSS-REFERENCE TO RELATED APPLICATIONS

This application is a U.S. patent application that claims the benefit of priority from EP Patent Application 10005641.5, filed May 31, 2010.

BACKGROUND OF THE INVENTION

1. Field of the Invention

The present invention relates to an automatic addressing system and method of communication between at least two devices connected via a bus system. In particular, the present invention refers to a bus system which enables the automatic and dynamic allocation of addresses.

2. Description of the Related Art

The IT and electronics branch provides a wide range of different data buses for the transfer of information. A bus system is concerned, when the subscribing devices are directed through an address and can be used according to a predetermined regime of the bus structure for transferring information. Most well-known bus systems as well as other transfer systems permit two-way data traffic. The subscribing devices must be assigned a distinct address. The most well known form of such a bus system or network is the Ethernet. Devices that wish to communicate in an Ethernet network must have a so-called MAC address and an IP address. The MAC address is unique over the total devices available on the market, whilst the IP address must only be unique in the particular network (that could be a firm network or more generally a so-called LAN (Local Area Network)). The MAC address is "fixed" for the device whilst the IP address can only be allocated dependent on duration. This transpires in most cases statically (single allocation in a point-to-point connection) or dynamically via Dynamic Host Configuration Protocol (DHCP).

Further known bus systems are I²C and RS 485. In these systems addresses are commonly allocated via software and hardware, but only in a point-to-point connection (a main device such as a PC, and an end device) or in the case of hardware, through implementing a particular resistance combination i.e. implementing a switch and thereby the coding of an address.

A problem with connecting new devices to a bus system is that a certain amount of manual interaction between the user and sensor unit is needed. Furthermore, when a main device is in operation, it is not always possible to connect a new device.

BRIEF SUMMARY OF THE INVENTION

The invention solves the aforementioned problems by providing an automatic addressing bus system and method of communication comprising a main and an end device, wherein the respective bus controllers used in the main and end devices comprise multi-master capability. Since the main device has an address known to the end device to be connected, the end device is able to actively initiate the address allocation procedure, without the need for user interaction. The method and system of the present system may be implemented using such known bus systems such as 2-wire serial buses, in particular I²C, as previously mentioned, and enables both automatic and dynamic address allocation.

Furthermore, according to another aspect of the present invention, a plurality of end devices may be implemented. Moreover, such new end devices may be connected during current operation of the main controlling device when already connected with other end devices, without conflicting with the devices in operation. Such conflicts may for example be caused when more than one end device connected to the bus has the same address.

Through implementation of the present invention, the connection of end devices on the bus system or network is thus simplified by enabling end devices to be activated during operation of the bus system. Furthermore, the user or the administrative IT organisation does not have to concern itself with the allocation of addresses. Hence, time and effort involved in the activation are significantly reduced.

DETAILED DESCRIPTION OF THE INVENTION

Figure 1:
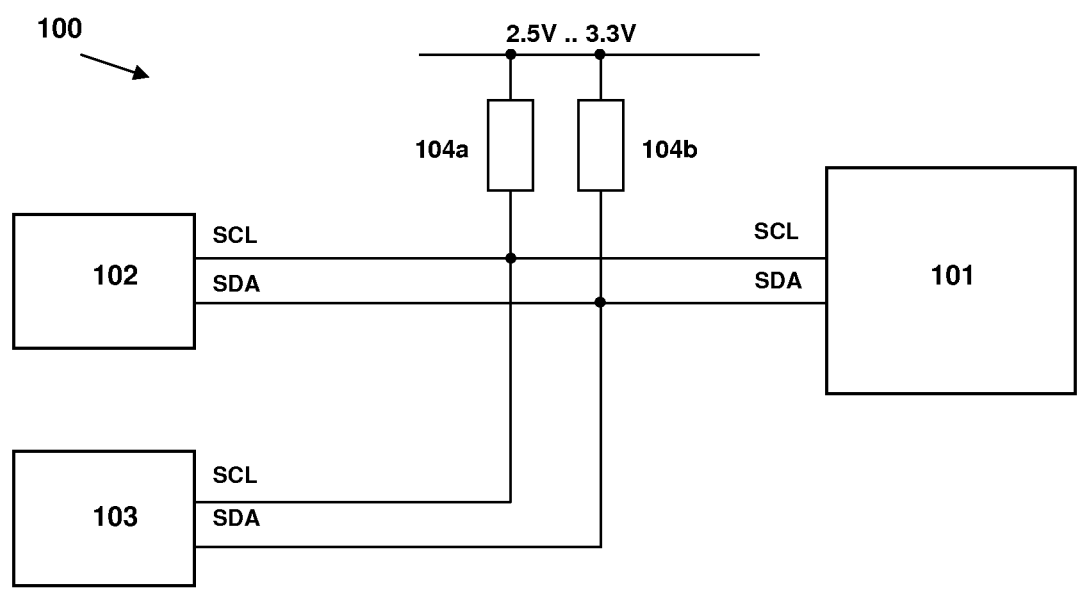
FIG. 1 is a diagram of a bus system according to an embodiment of the present invention.
Figure 2:
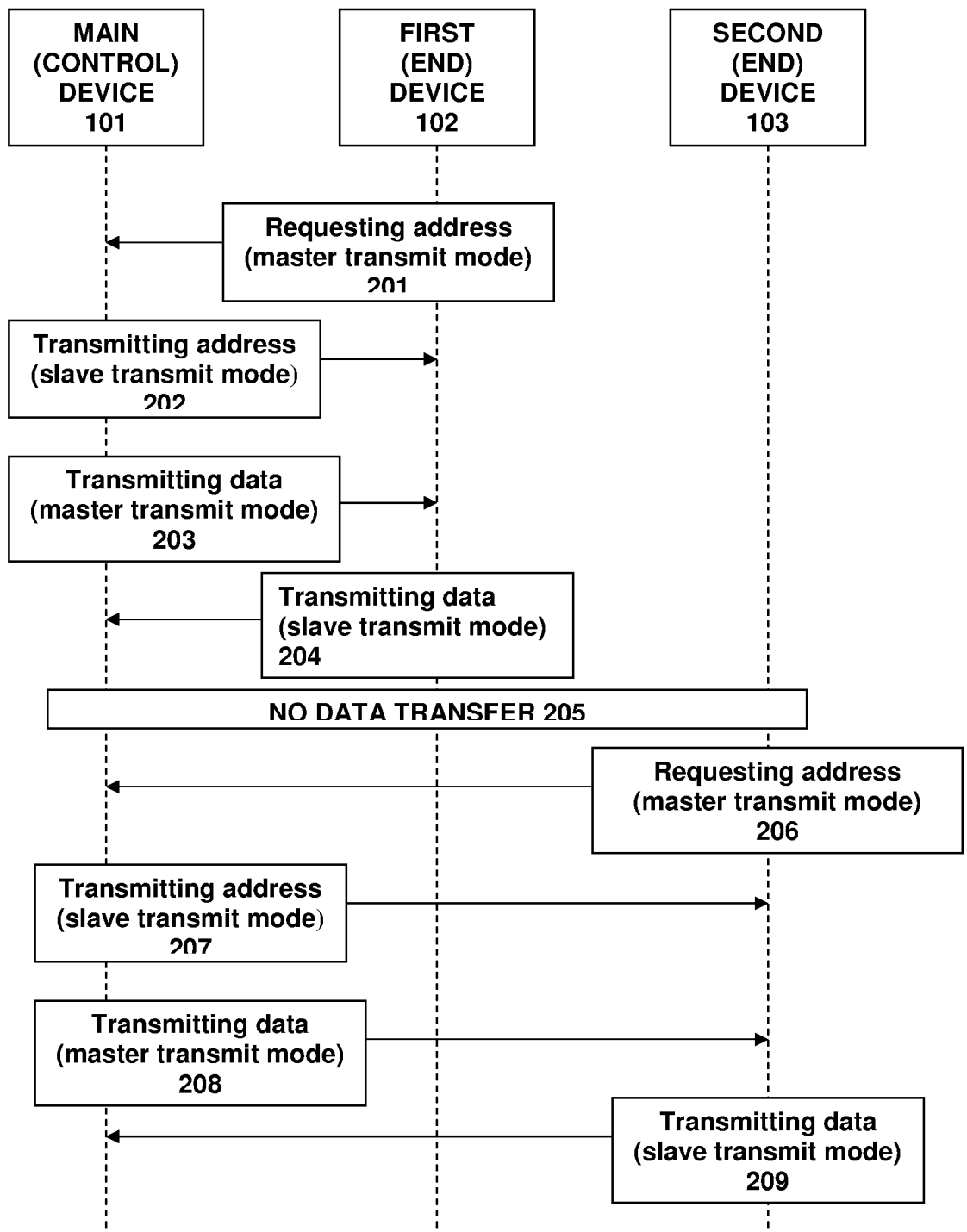
FIG. 2 is a handshake diagram illustrating an example of the steps for the addressing scheme according to the present invention.

According to the present invention, a bus controller is provided. The bus controller may be an integrated circuit.

According to the present invention, the aforementioned bus controller has multi-master capability. Such a multi-master bus controller may operate in both master and slave modes and enables multiple bus master devices to be present on the bus. This enables multiple devices on the bus to initiate data transfer.

As previously mentioned, an example of such a multi-master bus system is I²C which allows multiple devices may be connected to the bus and any of the multiple devices connected thereto to initiate a transfer with another device. An I²C bus comprises a serial data line (SDA) and a serial clock line (SCL) wherein both lines are bi-directional lines, connected to a positive supply voltage via a pull-up resistor 104a, 104b. An I²C bus generally has a plurality of devices attached to the bus such as a main device acting as a controller to at least one end device.

Each of the connected devices may be classified as either a master device or a slave device and communicate with the I²C bus via a unique address. A master device is a device that is able to generate a clock signal, initiate and terminate a data transfer. A slave device is a device that is normally addressed i.e. has an address allocated by such a master device. An I²C bus is capable of functioning with multiple master devices. A further description of the structure and operation of a generic I²C bus may be found in the Philips Semiconductors I²C Bus Specification, Version Rev. 03, June 2007.

In operation, an I²C bus allows communication between a master device and a slave device. When data exchange is desired, the master device addresses the slave device using the unique address of the slave device. After the slave device is addressed, the master device and the addressed slave may exchange data via the SDA line until the master device terminates the transfer. Since each device on the I²C bus has a unique address, each device may be individually accessed by the master device without affecting the communication with other connected devices.

According to the present invention, at all points in time wherein no traffic is present on the bus, the master device switches automatically to slave mode, unless controlling software present in the main and/or end device prevents this. Such controlling software in each of the devices may be implemented as firmware.

In accordance with the present invention a main device 101 is provided which may be a communication device that has a controlling function and in most cases forms an information drain. The main device 101 may be connected to a PC or a process master control station. The main device 101 further comprises a bus controller (not shown) with controlling software stored thereupon. The controlling software may be configured to always switch the bus control of the main device 101 to slave mode when the main device 101 has no demand for information. This procedure can also be effected automatically (without the intervention of software) when the bus controller directs the main device 101 over a so-called "automatic multi-master" mode. That is, the bus controller switches itself automatically to slave mode as soon as the communication task is fulfilled.

According to the present invention, at least one end device 102, 103 is provided. The end device 102, 103 is in most cases an information source such as a sensor head, for example, for measuring temperature. As with the main device 101, the end device 102, 103 also comprises a bus controller. The end device 102, 103 may be accessed over its bus controller wherein the bus controller further comprises multi-master capability.

EXAMPLE 1

According to a first example of a preferred embodiment of the present invention, all devices 101-103 are (electrically) connected by means of a bus system 100, such as those described above, and are switched on. The software in the end device 102, 103 then switches its bus controller to master mode. The end device 102 thereby "occupies" the bus and gains control of the bus traffic therewith.

As described above, since the end device 102 knows the (generic) address of the main controlling device 101, the end device 102 thereby opens communication with the main controlling device 101. In master transmit mode, the end device 102 in subsequently requests 201 an (unique) address from the main controlling device 101, which receives the request in slave receive mode. The address information may, for example, be stored in the main controlling device 101 in the form of a table. In response to the address request from the end device 102, the software present in the main controlling device 101 then chooses an address, forwards it to the bus controller and flags the address as "allocated". The main controlling device 101 then responds to the request in slave transmit mode by transferring the address to the end device 202, which is in master receive mode. Subsequent to this transfer, the software controlling the end device 102 now recognises the existence of the allocated address and enters the address in its own bus controller. Thereafter, the software controlling the end device switches its bus controller to slave mode. The address allocation process is thereby completed and the end device is "registered" with the main controlling device 101. Upon completion of this allocation process, the software controlling the main controlling device 101 can switch its bus controller to master mode, in order to communicate with the newly addressed and registered end device 203, 204.

EXAMPLE 2

In a second example according to a preferred embodiment of the invention, the first example may also be applied to a bus system in which a main controlling device 101 and a plurality of end devices 102, 103 are connected.

Initially, a main controlling device 101 and an end device 102 communicate according to the method of the first example i.e. bi-directionally with the main controlling device in master mode 101 and the end device 102 in slave mode. A further end device 103 is subsequently (electrically) connected to the bus system. After connection, the software controlling the new end device 103 (without allocated address) attempts to switch the bus controller from slave mode (output state) to master mode. This switching only occurs successfully when there is no data traffic available on the bus system at a particular point in time 205. Such points in time occur periodically, namely always when the main controlling device has fulfilled and completed a communication task.

The newly connected end device 103 utilises these "gaps", wherein there is no data traffic available on the bus, to switch itself to master mode. Since only one master can be registered on the bus system, the newly connected end device takes over the communication. To recap, the first connected end device 102 is "fixed" in slave mode. As with the first example, since the newly connected end device 103 knows the (generic) address of the main controlling device 101, the new end device 103 thereby opens communication with the main controlling device 101. In master transmit mode, the new end device 103 in subsequently requests 206 an address from the main controlling device 101, which receives the request in slave receive mode. In response to the address request from the new end device 103, the software present in the main controlling device then chooses an address, forwards it to the bus controller and flags the address as "allocated". The main controlling device 101 then responds to the request in slave transmit mode by transferring 207 the address to the new end device 103, which is in master receive mode. Subsequent to this transfer, the software controlling the new end device 103 now recognises the existence of the allocated address and enters the address in its own bus controller. Thereafter, the software controlling the new end device 103 switches its bus controller to slave mode. The address allocation process is thereby completed and the new end device 103 is "registered" with the main controlling device. Upon completion of this allocation process, the software controlling the main controlling device 101 can switch its bus controller to master mode, in order to communicate with the newly addressed and registered new end device, which is in slave mode 208, 209.

EXAMPLE 3

A further exemplary implementation (not shown) comprises the configuration whereby all devices (a main controlling device and more than one end device) are physically and electrically connected with the bus system. According to this example, the voltage source for all devices is initially switched off and is then switched on. Further, none of the connected end devices have allocated addresses.

The bus controllers arranged in both main controlling and end devices are initially in slave mode. The software of the individual end devices switches the bus controllers of each of the end devices to master mode. It is now decisive as to which of the end devices now actually gains control of the bus system, wherein time differences in the order of microseconds can be crucial. All other end devices partaking in bus traffic receive a "bus busy" signal and switch back to slave mode based on this.

As with the first example, since the end device knows the (generic) address of the main controlling device, the end device thereby opens communication with the main controlling device. In master transmit mode, the end device in subsequently requests an address from the main controlling device, which receives the request in slave receive mode. In response to the address request from the end device, the software present in the main device then chooses an address, forwards it to the bus controller and flags the address as "allocated". The main controlling device then responds to the request in slave transmit mode by transferring the address to the end device, which is in master receive mode. Subsequent to this transfer, the software controlling the end device now recognises the existence of the allocated address and enters the address in its own bus controller. Thereafter, the software controlling the end device switches its bus controller to slave mode. The address allocation process is thereby completed and the end device is "registered" with the main device.

The main controlling device and registered end device can now exchange data bi-directionally with the main device in master mode and the end device in slave mode. Since such data exchange is never 100% continual in the sense of bus traffic being completely used to capacity, time gaps arise between successive data requests and transmissions. During these time gaps, the main device generally switches its bus controller to slave mode. At this point in time i.e. the state of the bus system during a "gap", the respective bus controllers arranged in both main and end devices are in slave mode.

In a further step, the end device connected to the bus system subsequently receives the possibility to register on the bus system according to the previous step wherein the software of the individual end devices switches the bus controllers of each of the end devices to master mode. This procedure repeats itself until which point all of the end devices are registered on the main device. The main controlling device and all registered end devices may now exchange data bi-directionally with the main device in master mode and the end device in slave mode.

In accordance with the aforementioned examples the present invention provides a simple and convenient method by which end devices such as sensors, in particular temperature sensors to be connected to a main controlling device which is preferably a communication device which may be connected to a PC or a process master control station, without complication or need for user interaction. This can be particularly useful when obtaining different readings with such equipment in the field since a plurality of sensors such as infrared thermometers/pyrometers suitable for different applications may be connected as needed without complication. Apart from the improved compatibility, this also enables the sensors currently connected to maintain their operation, without the need to reconfigure, restart, or switch off the main controlling device. This advantageously ensures that no readings from the currently connected sensors are lost and thus avoids having to break the measurement procedure.

The invention claimed is:

1. A method for address allocation for a plurality of devices connected to a multi-master bus comprising:
    by a first device, switching to master mode, requesting allocation of a second address from a controlling device in slave mode using a known first address associated with the controlling device, storing the second address and switching to slave mode;
    wherein the first device is one of a plurality of devices switched to master mode, wherein the first device gains control of the bus in order to request allocation of the second address, and all other devices switch back to slave mode; and
    wherein, upon the first device having switched back to slave mode, the remaining plurality of devices switch to master mode and one of the remaining devices gains control of the bus in order to request allocation of a further address, and all other devices switch back to slave mode.

2. The method of claim 1, further comprising:
    by the controlling device, switching to master mode and communicating with the first device using the allocated second address.

3. The method of claim 1, further comprising:
    connecting a second device to the bus;
    by the second device, switching to master mode, requesting allocation of a third address from the controlling device in slave mode using the first address, storing the third address, and switching to slave mode.

4. The method of claim 1, further comprising determining that no data traffic is on the bus before switching to master mode.

5. The method of claim 1, wherein the controlling device is a communication device, which is configured to be connected to a PC or a process master control station, and the first device is an end device.

6. The method of claim 1, wherein all devices are initially in slave mode and the steps of switching modes and storing the addresses are carried out by software in the devices.

7. The method of claim 1, wherein all devices each comprise a bus controller with multi-master capability which is adapted to switch between master and slave modes.

8. The method of claim 1 wherein, in the step of requesting the known first address is a generic address, and, in response to the request, the controlling device generates a unique address associated with the requesting device from a look-up table and transmits it to the requesting device.

9. The method of claim 3, further comprising:
    by the controlling device, switching to master mode and communicating with the second device using the allocated third address.

10. A system for address allocation for a plurality of devices connected to a multi-master bus, the system comprising:
    a first device;
    controlling device;
    wherein the first device is adapted to:
        switch to master mode and request allocation of a second address from the controlling device in slave mode using a known first address associated with the controlling device, and
        store the second address and switch to slave mode; and
    wherein the first device is one of a plurality of devices switched to master mode, wherein the first device gains control of the bus in order to request allocation of the second address, and all other devices switch back to slave mode.

11. The system of claim 10, wherein
    the controlling device is adapted to switch to master mode and communicate with the first device using the allocated second address.

12. The system of claim 10 further comprising:
    a second device connected to the bus;
    wherein the second device is adapted to switch to master mode and request allocation of a third address from the controlling device in slave mode using the first address, and
    store the third address, and switch to slave mode.

* * * * *